July 21, 1953 E. J. HOUDRY 2,646,391
METHOD OF AND APPARATUS FOR CONVERTING HYDROCARBONS
Filed Oct. 25, 1947 4 Sheets-Sheet 1

INVENTOR.
Eugene J. Houdry
BY Gordon A. Kessler
ATTORNEY.

July 21, 1953 E. J. HOUDRY 2,646,391
METHOD OF AND APPARATUS FOR CONVERTING HYDROCARBONS
Filed Oct. 25, 1947 4 Sheets-Sheet 2

INVENTOR.
Eugene J. Houdry
BY
Gordon A. Kessler
ATTORNEY.

July 21, 1953  E. J. HOUDRY  2,646,391
METHOD OF AND APPARATUS FOR CONVERTING HYDROCARBONS
Filed Oct. 25, 1947  4 Sheets-Sheet 3
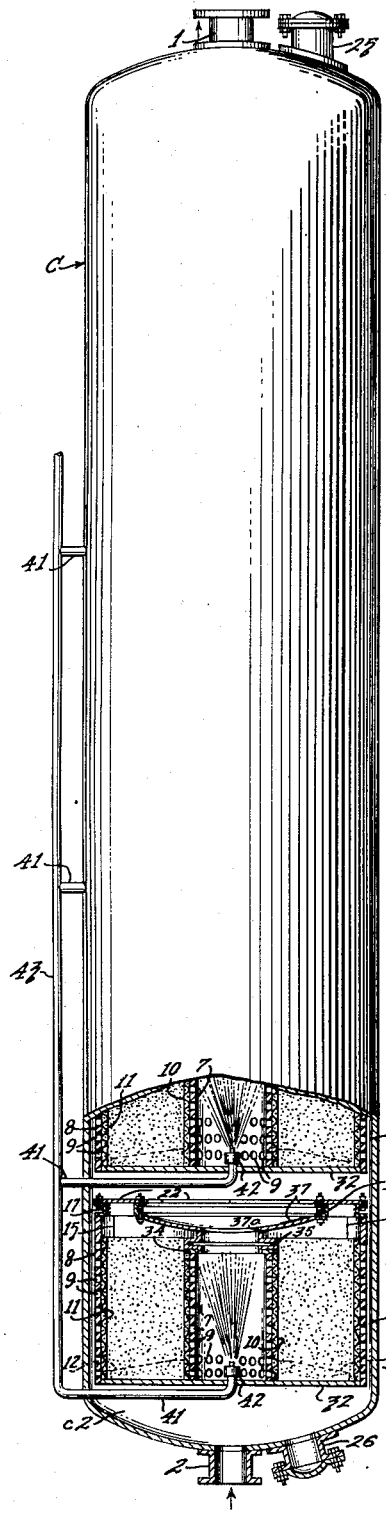
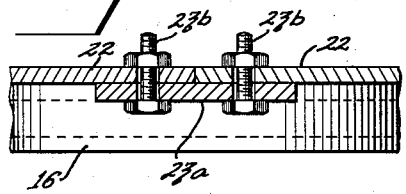
Fig. 10
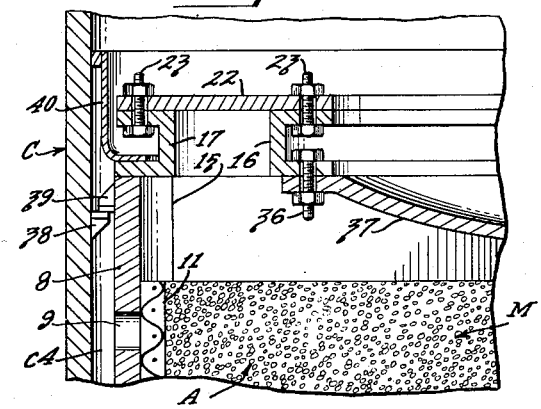
Fig. 15
Fig. 16
INVENTOR.
Eugene J. Houdry
BY
ATTORNEY.

July 21, 1953  E. J. HOUDRY  2,646,391
METHOD OF AND APPARATUS FOR CONVERTING HYDROCARBONS
Filed Oct. 25, 1947  4 Sheets-Sheet 4
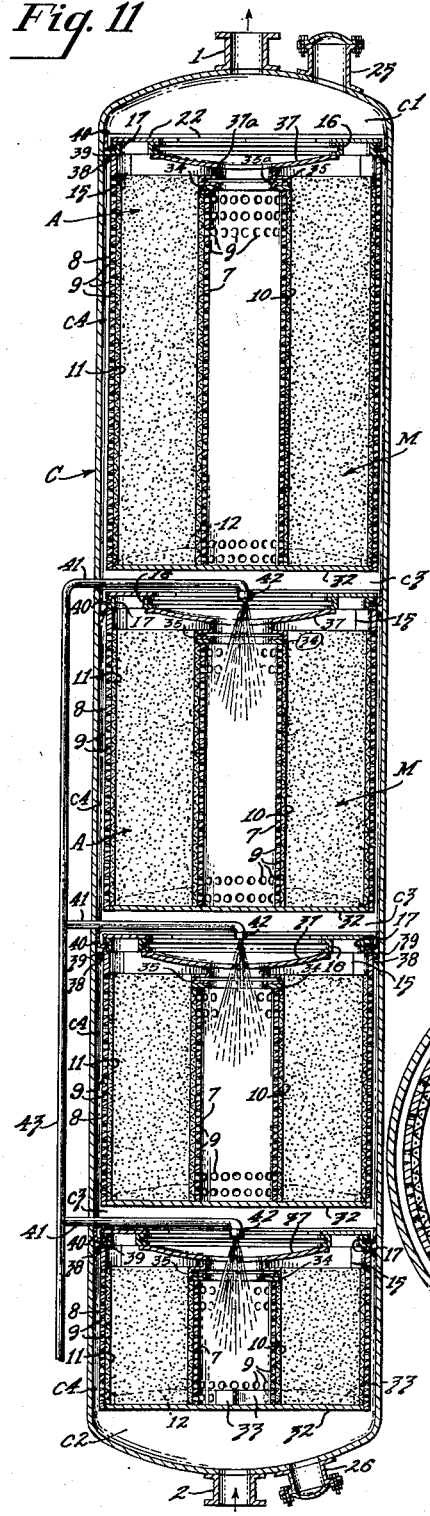
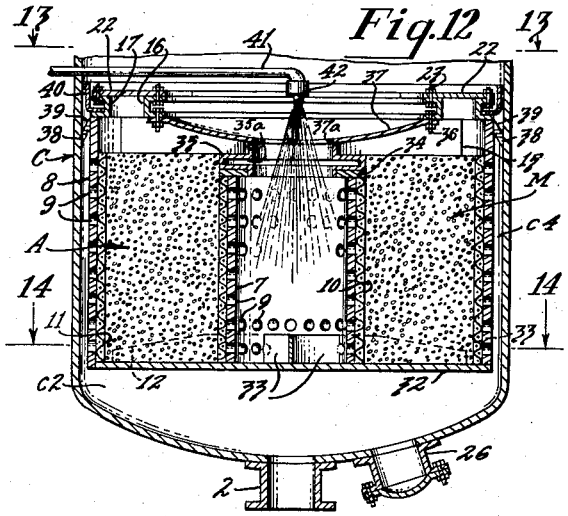
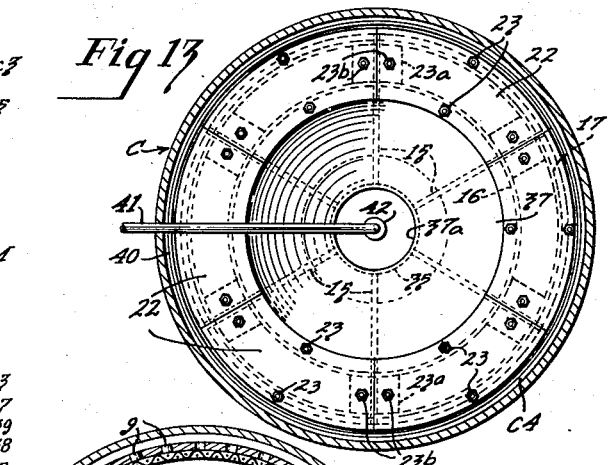
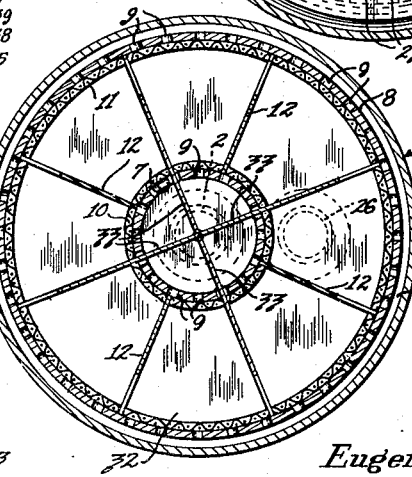
INVENTOR.
Eugene J. Houdry
BY
ATTORNEY.

Patented July 21, 1953

2,646,391

UNITED STATES PATENT OFFICE 2,646,391

METHOD OF AND APPARATUS FOR CONVERTING HYDROCARBONS

Eugene Jules Houdry, Ardmore, Pa., assignor to Houdry Process Corporation, Wilmington, Del., a corporation of Delaware Application October 25, 1947, Serial No. 782,165

14 Claims. (Cl. 196—52)

My invention relates to a method of and apparatus for converting hydrocarbon material.

My invention, from one of its important aspects, relates to a hydrocarbon conversion arrangement comprising a plurality of annular contact masses supported within a housing or casing in suitable spaced relation and adapted, during an on-stream period, to be traversed by a stream of hydrocarbon vapors which may flow through each contact mass either toward or from the longitudinal axis thereof. In accordance with the invention, the hydrocarbon vapors are cooled in suitable manner while passing from one contact mass to the succeeding contact mass.

More particularly as regards one form of the invention, the outer peripheral support of each contact mass is spaced from the adjacent interior surface of the housing or casing to define an annular chamber. As the conversion operation proceeds, relatively cool hydrocarbon vapors pass through one annular chamber and then, while the temperature thereof rises to substantial extent, flow transversely through the adjacent contact mass to form hot converted products. In accordance with the invention, these hot products, prior to passage thereof through the succeeding annular chamber, are cooled so that the temperature thereof is substantially below that temperature which, during the on-stream period, the succeeding contact mass tends to impart to the adjacent housing portion. Accordingly, it is a feature of the invention that these cooled products pass through the annular chamber last named to effectively and continuously prevent the heat of the adjacent contact mass from raising the temperature of the housing portion last named to any substantial extent above that of said cooled products.

From a somewhat broader aspect, my invention relates to a hydrocarbon conversion arrangement wherein hot converted products pass from a contact mass having suitable configuration, not necessarily annular, and comprising catalytic or inert contact material either solely or in admixture with each other. However, it is characteristic of this broader concept of the invention that the hot converted products last named are cooled in suitable manner as and for the purpose stated prior to passage thereof through an annular chamber and an annular contact mass of the character described above.

My invention, from another important aspect, relates to the passage of hydrocarbon vapors through an annular contact mass, and then into and through the chamber which extends axially or longitudinally thereof. As this operation proceeds, hydrocarbon material having temperature substantially lower than that of the converted products is passed into said chamber, which serves as a mixing zone, to produce a vapor mixture having an intermediate temperature. Preferably, although not necessarily, the aforesaid hydrocarbon material is at least partly in the liquid phase and this, in accordance with the invention, is directed into said chamber or zone as an atomized mixture.

My invention relates further to structural features embodied in a supporting arrangement for an annular contact mass, to improved arrangements which promote uniform flow of vapors through such a contact mass at different levels and to other detailed features of the character hereinafter described.

Various other objects and features of my invention will become apparent from the following detailed description.

My invention resides in the method of and apparatus for converting hydrocarbons, improved cooling and heat-transfer features, combinations and arrangements of the character hereinafter described and claimed.

For an understanding of my invention and for an illustration of some of the forms thereof, reference is to be had to the accompanying drawings, in which.

Figure 1:
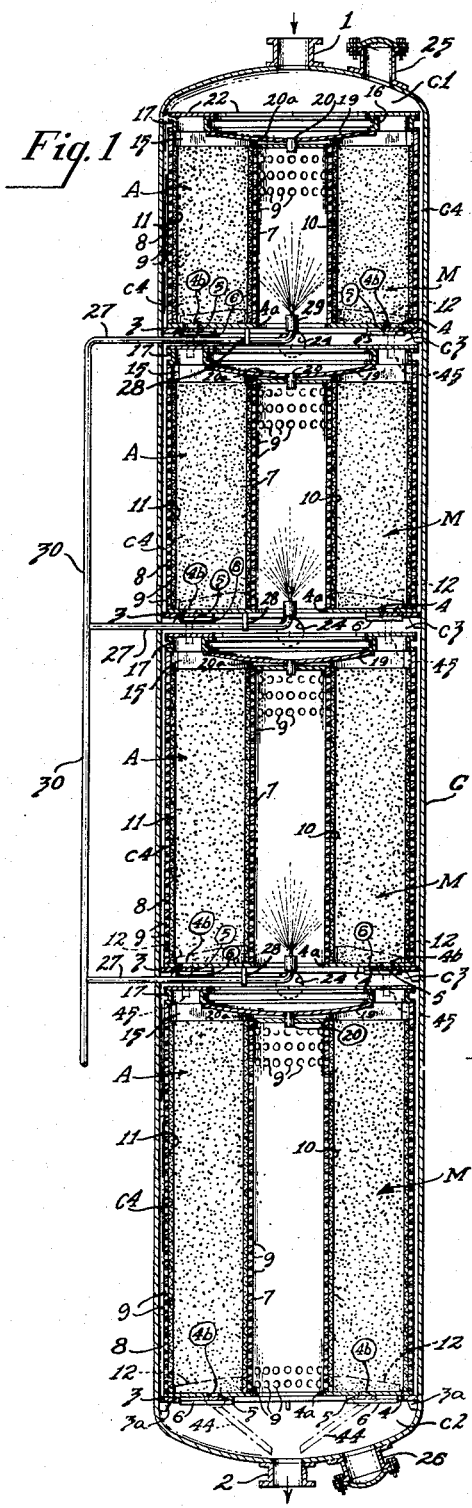
Fig. 1 is a vertical sectional view, partly in elevation, showing a converter or reactor as constructed in accordance with my invention.
Figure 2:
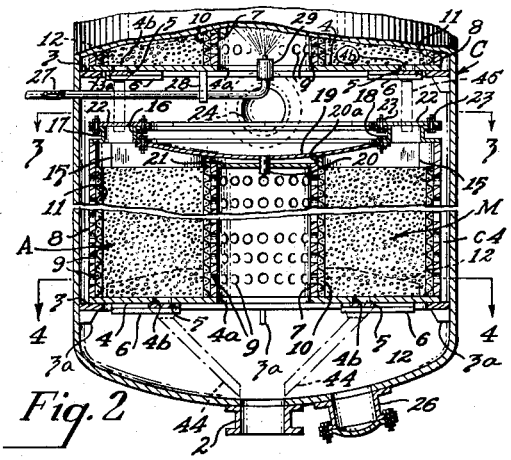
Fig. 2 is an enlarged sectional-elevational view showing the lower portion of the apparatus illustrated in Fig. 1.
Figure 3:
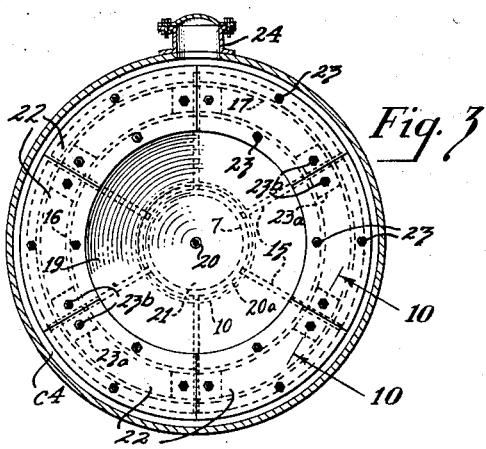
Figure 4:
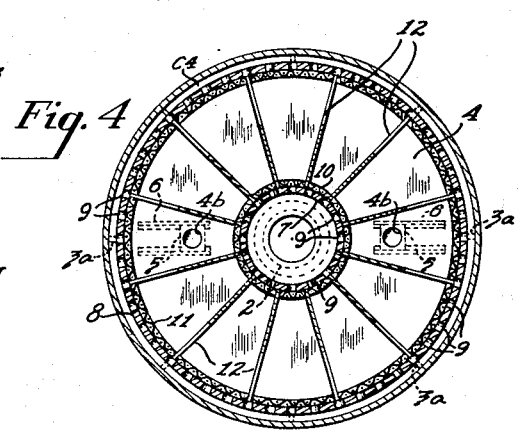
Figure 5:
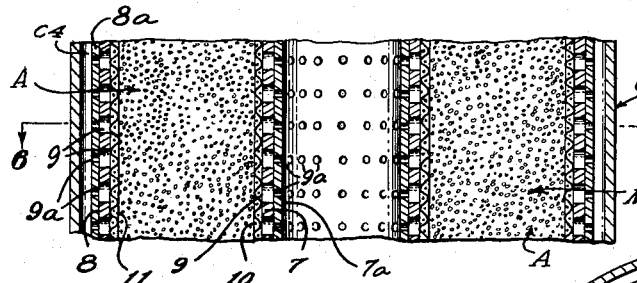
Figure 7:
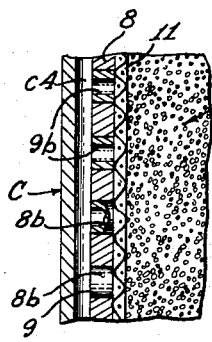
Figure 6:
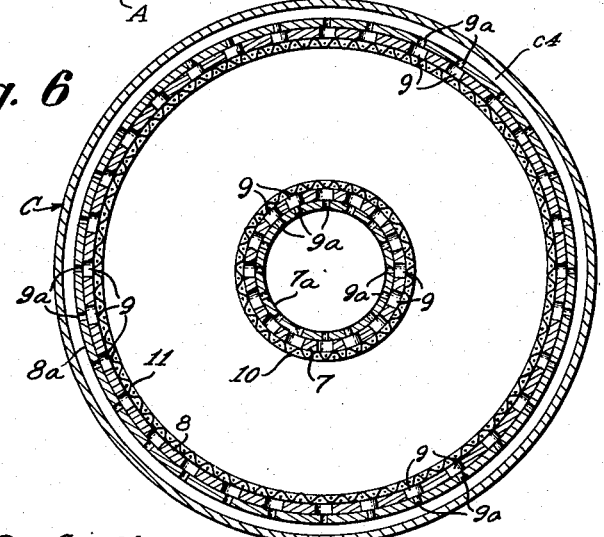
Figure 8:
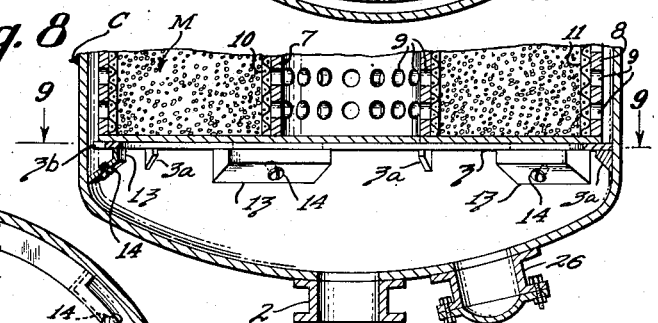
Figure 9:
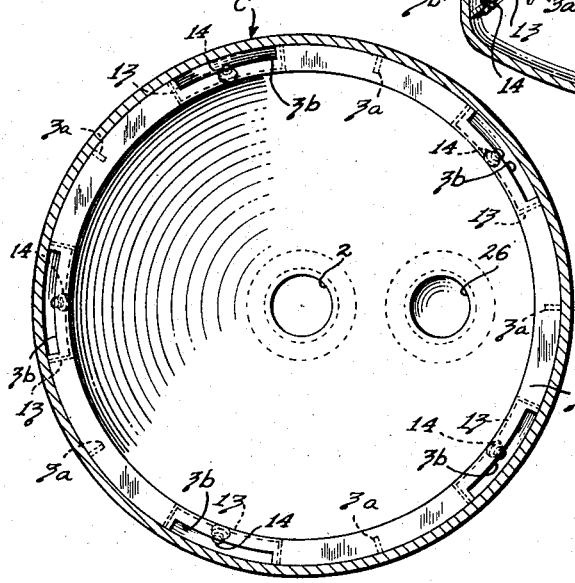

Figs. 3 and 4 are horizontal sectional views, partly in plan, taken on the respective lines 3—3 and 4—4 of Fig. 2;

Fig. 5 is an enlarged elevational view, partly in section, showing an arrangement for promoting uniformity of vapor distribution through a contact mass;

Fig. 6 is a horizontal sectional view, partly in plan, taken on the line 6—6 of Fig. 5;

Fig. 7 is a fragmentary elevational-sectional view showing a modified vapor-distributing arrangement;

Fig. 8 is a fragmentary, vertical sectional view, partly in elevation, showing a detailed feature of the invention;

Fig. 9 is a horizontal sectional view, partly in plan, taken on the line 9—9 of Fig. 8;

Fig. 10 is a vertical sectional view, partly in elevation, taken on the line 10—10 of Fig. 3;

Fig. 11 is a vertical sectional view, partly in elevation, showing a converter or reactor wherein hydrocarbon material flows in reverse direction compared with the direction flow indicated in Fig. 1;

Fig. 12 is an enlarged sectional-elevational view showing the lower portion of the apparatus illustrated in Fig. 11;

Figs. 13 and 14 are horizontal sectional views, partly in plan, taken on the respective lines 13—13 and 14—14 of Fig. 12;

Fig. 15 is an enlarged sectional-elevational view illustrating a detailed feature of the apparatus shown in Fig. 11; and Fig. 16 is an elevational view, partly broken away, showing concurrent operation of the apparatus illustrated in Fig. 11.

Referring to the drawings, C represents a casing, housing or shell which, preferably, is circular in horizontal section. Preferably, the casing C is disposed in vertical upstanding relation and the casing height should be substantially greater than the casing diameter. As shown in Fig. 1, the top and bottom walls of the casing C comprise the respective passages 1 and 2. In accordance with the invention, a plurality of separate contact masses M are supported interiorly of the casing C in suitable spaced relation, each contact mass being formed from suitable contact material A of the character hereinafter described. When the contact material is of the catalytic type and, if it does not have sufficient density and heat-absorbing capacity to retain the requisite amount of heat to support the desired hydrocarbon conversion operation, it may have mingled therewith a suitable amount of inert contact material having the required heat-absorbing capacity. Fused alumina is suitable for this purpose as is fused refractory material containing about 70% alumina and the remainder largely silica. The proportion of catalytic contact material to inert contact material may range from 1:4 to 3:1 or otherwise as may be desirable.

Referring particularly to Figs. 2, 3 and 4, the lower interior wall surface of the casing C is shown as carrying an annular member or support 3 utilizable for supporting the lower contact mass M and which, preferably, comprises a plurality of spaced, depending ribs 3a adapted to reinforce said annular support 3. Resting upon the upper surface of the support 3 and freely detachable therefrom is a circular bottom plate 4 which comprises a central circular aperture 4a. The plate 4 may further comprise a pair of transversely alined passages 4b which normally are closed by the respective members 5, each of which is slidable in a suitable track or guide arrangement 6 carried by the lower surface of said plate 4.

Inner and outer tubular members 7 and 8 upstand from the plate 4 in vertical concentric relation, the upper surface of the outer tubular member 8 terminating at a level somewhat higher than that of the inner tubular member 7, Fig. 2. The inner surface of the tubular member 7 may coincide with the surface of the plate 4 which defines the aperture 4a and the exterior surface of the tubular member 8 may coincide with the exterior surface of said plate 4, Fig. 2, the arrangement being such that the tubular member 8 is suitably spaced from the interior wall surface of the casing C for a purpose hereinafter to be described. These tubular members are welded or otherwise suitably secured to said plate 4 and each of them, throughout the area thereof, comprise numerous small passages 9 which may be arranged in horizontal rows, as shown in Figs. 1 and 2, in uniform spaced relation with respect to each other. Disposed in flush engagement with the outer surface of the tubular member 7 and the inner surface of the tubular member 8 are the respective screens 10 and 11, these parts being spot-welded or otherwise suitably secured together. Ordinarily, the diameter of the passages 9 in the tubular members 7 and 8 is such that the described contact material may pass therethrough but this is prevented by the screens 10 and 11 which have mesh dimensions suitably small for this purpose.

As clearly appears in view of the foregoing, the tubular members 7 and 8 define an annular chamber for the reception of the contact material forming the lower contact mass M, the tubular member 8 serving as the outer peripheral support for said contact mass. Further, the tubular member 7 defines an open chamber which serves as a mixing zone in the manner hereinafter described.

As shown in Figs. 1, 2 and 4, a plurality of uniformly spaced webs or ribs 12 upstand from the aforesaid bottom plate 4 in radial relation with respect thereto. These webs 12 are welded or otherwise suitably secured to the upper surface of said plate 4 as well as to the tubular members 7, 8 and they stiffen the bottom plate 4 so as to render it capable of supporting the weight imposed thereon by the lower contact mass M. Obviously, in lieu of the annular support 3, the bottom plate 4 and the webs 12, any other suitable arrangement may be provided for supporting the contact mass last named.

In accordance with a detailed feature of the invention and for a purpose hereinafter to be described, the aforesaid annular support 3 may comprise a plurality of spaced slots or passages 3b, Figs. 8 and 9. Each slot 3b communicates with a depending housing or box 13 secured to the lower surface of the support 3 and the adjacent interior surface of the casing C, each housing 13 comprising a lower outlet passage normally closed by a detachable plug 14.

Referring to Figs. 1, 2 and 3, a plurality of webs or ribs 15 are shown as extending radially with respect to the casing C, these webs being welded or otherwise suitably secured to the upper ends of the tubular members 7 and 8. Suitably secured, as by welded joints, to the webs 15 are inner and outer, concentrically related channel members 16 and 17 which are disposed in a common horizontal plane. Suitably secured, as by bolts 18, Fig. 2, to the lower horizontal portion of the channel member 16 is a dished member 19 having a centrally disposed drain pipe 20 of small diameter depending therefrom and extending through a plate 21 suitably secured, in sealing relation, to the interior, upper surface of the inner tubular member 7, the lower surface of the member 19 being welded to the webs 15. For sealing purposes the member 19 should have a ring 20a suitably secured thereto, this ring extending downwardly and being secured to the upper surface of the tubular member 7. The upper surfaces of the respective channel members 16 and 17 support a plurality of arcuate plates 22 which entirely close the space defined by said channel members 16 and 17. As shown in Figs. 2 and 3, bolts 23 may be utilized for detachably securing the plates 22 to said channel members 16 and 17. Adjacent ends of the plates 22 engage each other in abutting relation and, as shown in Fig. 10, a plate 23a may be disposed beneath the end portions of each pair of said plates and between the channel members 16, 17. Each plate 23a should be detachably secured to the plate end portions with which is cooperates by one or more bolts 23b.

In view of the foregoing description, it will be understood that, except for the small drain pipe 20, the cover arrangement comprising the channel members 16 and 17, dished member 19 and plates 22 entirely closes the top of the chamber defined by the outer tubular member 8, this chamber containing the lower contact mass M and the inner tubular member 7. It will also be understood that the annular member 3 together with all of the parts supported thereby are formed preferably from metallic materials such as steel which is suitably resistant to stresses and high temperatures.

As clearly appears from Fig. 1, the casing C carries a plurality of the annular supports 3 which are disposed at different respective levels, the distance between each pair of adjacent supports progressively decreasing, in the form of the invention shown in Fig. 1, in a direction extending upwardly from the bottom of the casing. Each annular support 3, above the lower one, detachably carries an assembly of parts which, except dimensionally and in one minor respect regarding the bottom plate 4 as noted below, is a duplicate of the assembly hereinbefore described as carried by the lower annular support 3. Hence, further description of these assemblies is considered unnecessary. In view of the foregoing, it will be understood that the heights of the respective contact masses M progressively decrease in an upward direction. Further, this height relation is such that there is a chamber $c1$ at the top and a chamber $c2$ at the bottom of the casing C. In addition, there is a chamber $c3$ between each adjacent pair of contact masses and, preferably, the chambers last named are dimensionally the same. Still further, as stated, the exterior diameter of each tubular member 8, the outer peripheral support for each contact mass M, is suitably less than the interior diameter of the casing C so that each tubular member together with the adjacent casing surface defines an annular chamber $c4$ utilizable as hereinafter described. Each chamber $c4$ is open at its top as defined by the periphery of a channel member 17 and each of said chambers $c4$ is closed at its bottom by an annular support 3. Hence these chambers $c4$ extend in contiguous relation throughout substantially the entire height of the casing C. As shown in Figs. 1 and 3, the casing C is constructed to provide a manhole 24 which opens into each of the chambers $c3$.

It was hereinbefore stated that the bottom plate 4 for supporting the lower contact mass M comprises a pair of transversely alined passages 4b. As shown in Figs. 1 and 4, these passages are disposed relatively close to the central plate aperture 4a. The bottom plate 4 for supporting each of the upper contact masses comprises a similar pair of transversely alined passages 4b but, as regards each of these upper plates, the passages 4b thereof are disposed relatively close to the plate periphery, Fig. 1. Preferably, although not necessarily, the aforesaid plate passages 4b are disposed in a common vertical plane. Further, the casing C should comprise a manhole 25 in the top wall thereof and a manhole 26 in the bottom wall thereof.

As shown in Fig. 1, a pipe or conduit 27, which may be supported as at 28, extends into each of the casing chambers $c3$. The inner end of each pipe 27 is upturned and terminates in a suitable nozzle or atomizer 29 which should open upwardly through the aperture 4a of the adjacent plate 4 preferably, but not necessarily, in coincidence with the longitudinal axis of that tubular member 7 which is disposed thereabove. As indicated, all of the pipes 27 may be connected to a common supply pipe 30.

Preferably, and as hereinafter specifically described, the casing C defines a zone wherein hydrocarbon material is subjected to a cracking operation and, if so, the contact material A is of catalytic character. Any suitable kind of catalytic contact material may thus be utilized such, for example, as activated clay pellets or synthetic silica-alumina pellets or beads, etc., having suitable major dimensions such as between $\frac{1}{16}$ and $\frac{3}{4}$ of an inch. Other suitable catalysts for cracking include synthetic plural oxide composites, silicious or non-silicious in character and containing, for example, zirconia, alumina or beryllia. The following description is directed specifically to a cracking operation but, in lieu thereof, it shall be understood that the apparatus of my invention may be utilized for effecting other types of conversion operations such, for example, as one wherein suitable hydrocarbon material is desulphurized under known conditions with catalytic contact material of the general character referred to above, or equivalent. Or, reforming or dehydrogenation of naphthas or other normally liquid hydrocarbons may be effected in the presence of the above or other desired type of catalyst, certain of which are known in the art.

A reactor or converter of the character herein described is adapted to be operated cyclically in the sense that the contact masses M are alternately on-stream and in regeneration. As disclosed in my pending application Serial No. 505,109, filed October 6, 1943, now abandoned, the contact masses M may be regenerated by burning previously deposited carbonaceous material therefrom to store heat in the contact material and elevate the temperature thereof into a suitable hydrocarbon cracking range such, for example, as between approximately 800° F. and 1250° F. In this connection, it should be noted that regeneration of a bed of contact material as described above usually causes the bed temperature to have maximum value at some location within the bed. At other locations, the bed temperature is lower and, as regards the contact material immediately adjacent the tubular member 8 of each contact mass M, the temperature thereof may be of the order of 900° F. to 1100° F. at the start of each period of on-stream operation. After completion of regeneration, an on-stream operation may be effected as follows.

In accordance with the general disclosure of my pending application Serial No. 694,327, filed August 31, 1946, now Patent No. 2,507,523, hydrocarbon vapors to be cracked may be obtained from a fractionating zone. After the temperature thereof has been elevated into a suitable range such, for example, as from 800° F. to 900° F. and preferably approximately 850° F., they are admitted continuously to the casing C by way of the passage 1. Obviously, hydrocarbon vapors to be cracked and having temperature as stated may be obtained from any other suitable source for the purpose stated.

Further in accordance with the general disclosure of my aforesaid application Serial No. 694,327, hydrocarbon cracking material from any suitable source such, for example, as from the bottom of the aforesaid fractionating zone is passed through the pipe 30 and then through the pipes 27. The hydrocarbon material last named may be totally in the vapor phase but, preferably, it is substantially totally liquid or at least partly in the liquid phase and the following description is directed to hydrocarbon material having this phase condition. The temperature of the hydrocarbon material traversing the pipes 27 should be substantially lower than that of the hereinafter described cracked products issuing from the contact masses M into the respective mixing zones described below, the temperature of such cracked products being, for example, from 50° F. to 150° F. higher than that of the vapor material entering the respective contact masses. Thus, the hydrocarbon material traversing said pipes 27 may be, for example, 75° F. to 125° F. lower than said cracked products or, if desired, the temperature thereof may be in the approximate range of 300° F. to 500° F.

After admission to the casing C by way of the passage 1, the vapors enter the chamber $c1$ and thereafter are deflected by the upper cover arrangement comprising the channel members 16 and 17, dished member 19 and plates 22 so that said vapors flow downwardly through the upper chamber $c4$ and are prevented from escaping from the bottom thereof by the upper annular member 3. Thereafter, the vapors pass through the passages 9 of the adjacent outer tubular member 8, then transversely through the contact material forming the upper contact mass M, then through the passages 9 of the adjacent, inner tubular member 7 and finally into and downwardly through the mixing zone defined by said tubular member 7, the vapors being cracked in response to passage thereof through said last named contact mass and the temperature thereof being elevated to substantial extent toward that of said contact mass to produce cracked vapor-phase products having temperature as they leave the exit end of the contact mass ranging, for example, between 850° F. and 1050° F.

As the operation proceeds, hydrocarbon cracking material of the character hereinbefore described, while at least partly in the liquid phase, passes continuously through the upper pipe 27, the upper nozzle 29 and then upwardly within the aforesaid mixing zone in counter-current relation as regards the descending cracked vapor-phase products from the upper contact mass M. By reason of the fact that, as stated, the temperature of the ascending hydrocarbon cracking material, which is in desired atomized condition, is substantially lower than that of the descending cracked products, exchange of heat occurs with resultant production of a downwardly moving vaporized mixture having temperature preferably in a range between 800° F. and 900° F. This vaporized mixture, during continued downward movement thereof, passes into the upper chamber $c3$ and thereafter is deflected by the upper cover arrangement of the succeeding contact mass M directly beneath the upper contact mass M so as to flow downwardly into the chamber $c4$ at the periphery thereof.

Thereafter, as regards each succeeding contact mass, the operation proceeds in the manner described above with respect to the upper contact mass M. Eventually, the cracked vapors leave the casing C by way of the passage 2 and pass to any suitable destination, not shown.

When hydrocarbon material, at least partly in the liquid phase, is admitted to the respective mixing zones defined by the tubular members 7, the operation should be conducted under conditions such that vaporization of such liquid phase material occurs substantially in a complete manner while in the aforesaid mixing zones or in the respective chambers $c3$ disposed therebelow. However, should small amounts of unvaporized material be present, the respective pipes 28 conduct such unvaporized material into the lower mixing zones. As will be understood, the aforesaid conditions involve the magnitude of the heat which is exchanged, the duration of the heat-exchange periods, character of the liquid hydrocarbon material traversing the pipes 27 as regards boiling range, etc.

During the described regenerating operation and as described in my aforesaid application Serial No. 505,109, now abandoned, the heat stored in the contact masses is in excess of that required for reaction purposes as regards the hydrocarbon material during passage thereof through said contact masses. As hereinbefore stated, the temperature of the contact masses M, during regeneration, may be elevated into a range such, for example, as between approximately 800° F. and 1250° F. In this connection and as stated, regeneration of a contact mass usually causes the contact mass to have maximum temperature at some location within the mass. However, at other locations, the contact mass temperature is substantially lower than the maximum value stated above and this, of course, holds true as regards the average contact mass temperature.

The temperature and quantity of the vapors admitted to the casing C by way of the passage 1, Fig. 1, should be such, compared with the average temperature of the upper contact mass, Fig. 1, that these vapors, during each on-stream period, remove approximately all of the stored heat of regeneration therefrom, this including the excess heat hereinafter referred to. In this manner, the contact mass M last named is maintained in thermal balance during successive, alternating regeneration and on-stream periods.

During the on-stream period, the respective heat-exchange operations which are conducted in the mixing zones defined by the respective tubular members 7 of the upper three contact masses, Fig. 1, cool the respective streams of cracked products which are issuing therefrom to substantial extent and produce, respectively, lower temperature vaporized mixtures which remove approximately all of the stored heat of regeneration (including the excess heat) from the respective three lower contact masses M, Fig. 1. By adjusting the quantity and/or temperature of the hydrocarbon material traversing the pipes 27, desired quantities of this excess heat may be withdrawn from the contact masses last named in order to maintain them in thermal balance during continuance of successive on-stream and regeneration periods.

The operation referred to above is characterized by temperature undulation of the reactants as they pass along their intended path through the casing C. Thus, the temperature of the vapors admitted to said casing C by way of the passage 1 is elevated as they pass through the upper contact mass M. The temperature of the vaporized mixture produced in the upper mixing zone is lower than the average temperature of the succeeding contact mass and this vaporized mixture has its temperature elevated during passage thereof through the contact mass last named. Accordingly, as the operation proceeds, the temperature of the reactants undulates in the sense that it falls while said reactants pass through the mixing zones and rises while they traverse the contact masses.

At the end of the on-stream period referred to above, the temperature of the contact masses has been reduced to a desired lower level. Thereafter, the contact masses are regenerated in known manner in response to the passage therethrough of air or other regenerating medium having suitable temperature with resultant combustion of carbonaceous material which was deposited on the contact material during the on-stream operation and elevation in temperature of said contact material into a range as hereinbefore described which is suitable for effecting the succeeding on-stream period. During the regeneration operation, the regeneration medium may pass in either direction through the casing C by way of the passages 1 and 2 or otherwise as may be desirable.

It was hereinbefore stated that hydrocarbon vapors from each chamber c4 flow horizontally in succession through the passages 9 of the adjacent outer tubular member 8, through the adjacent contact mass and then through the passages 9 of the adjacent inner tubular member 7. As will be understood, the vapors, in order to obtain efficient conversion thereof, should be distributed substantially uniformly as they traverse each contact mass or, in other words, each passage 9, regardless of its location, should be traversed by substantially the same quantity of vapors per unit of time as any other passage. The described tubular members necessarily have substantial thickness in order to bear the load imposed thereon without substantial deformation and, from the manufacturing viewpoint, it is desirable for the passages 9 for each tubular member to be produced by a punching operation. With procedure of this character, the diameter of each passage 9, ordinarily, may not be less than the thickness of the plate in which said passages are formed. The passages 9, then, may have such large diameter that vapor flow through the contact masses is more or less nonuniform, this condition arising by reason of the fact that the upper passages 9 are traversed by an unduly large proportion of the vapors compared with the proportion thereof traversing the lower passages 9.

A condition such as described immediately above may be avoided to substantial extent by utilizing an arrangement of the character illustrated in Figs. 5 and 6 wherein, if desired, one or both of the tubular members 7a and 8a may be disposed, respectively, interiorly of the tubular member 7, and exteriorly of the tubular member 8, the respective sets of these members being spot-welded or otherwise suitably secured together in flush engagement and the thickness of each tubular member 7a and 8a being substantially less than that of either tubular member 7 or 8. By a punching operation, passages 9a may be formed in the plates from which the tubular members 7a and 8a are produced and, since the diameter of each passage 9a is dependent on the thickness of said plates, such diameter of each passage 9a may be substantially less than the diameter of each passage 9. As is clearly shown in Figs. 5 and 6, all of the passages referred to above should be so located in the respective tubular members that, in the resulting assembly, the passages 9 and 9a are alined in pairs with each pair having a common longitudinal axis. As will be understood in view of the foregoing, the tubular members 7a and 8a together with the passages 9b thereof effectively control flow of the hydrocarbon vapors so as to obtain substantially uniform distribution thereof throughout the vertical height of each contact mass M.

In lieu of the vapor-distributing arrangement described above, I may utilize, if desired, an arrangement of the character illustrated in Fig. 7 which indicates that each passage 9 of all the tubular members 8 has a bushing 8b disposed therein, a driving-fit operation preferably being utilized in order to retain the bushings 8b in seated position and each bushing 8b comprising a central passage 9b extending entirely therethrough. It will be understood that each passage 9 of the inner tubular members 7 may have associated therewith a bushing of the character described above and, if so, all of the bushing passages function the same as the above described passages 9a in order to obtain desired distribution of vapors traversing any contact mass M.

During the regeneration operation, when a regenerating medium is passed through the casing C, it will be understood that the arrangements of either Figs. 5 and 6 or Fig. 7 function effectively to promote uniform distribution of such medium during passage thereof through the contact masses M.

As regards the form of my invention previously described, the hydrocarbon vapors pass from the top of the casing C to the bottom thereof and, in so doing, traverse the contact masses M in succession. However, the invention is not to be so limited since the direction of the vapors may be the reverse of that described immediately above.

Thus, referring to Figs. 11–14 inc. I have shown a casing C corresponding with the casing C hereinbefore described and adapted to serve as a shell or housing for a plurality of contact masses M. As illustrated particularly in Figs. 11, 12 and 14, the contact material forming the lower contact mass M rests upon a circular bottom plate 32 which is welded or otherwise suitably secured to the lower surfaces of concentric tubular members 7 and 8, the latter being of the character hereinbefore described. As clearly appears, the plate 32 closes the bottom of the chamber defined by the outer tubular member 8 and prevents upward passage of vapors through any part thereof. This plate 32 should comprise a central restricted passage, not shown, which has the same function as the hereinbefore described drain pipes 20. The same as hereinbefore described with respect to the bottom plate 4, stiffening webs or ribs 12 upstand from and are secured to the plate 32, and also to the tubular members 7, 8. If desired, a pair of additional stiffening webs or ribs 33 related to each other in right-angle relation may extend diametrically across the plate 32, the ribs last named passing through slots provided respectively therefor in the tubular member 7. The ribs 33 may be welded to each other where they intersect at the center of the plate 32 and all of said ribs should be welded or otherwise suitably secured to the upper surface of said plate 32 and also to the tubular members 7 and 8.

As stated above, the tubular members 7 and 8 shown in Figs. 11, 12 and 14 are of the same character as those previously described with respect to Figs. 1–4 inc. Likewise, screens 10 and 11 as hereinbefore described should be associated with the respective tubular members 7 and 8 of Figs. 11, 12, 14 and, in addition, the passages 9 of said last named tubular members may have associated therewith vapor-distributing arrangements of the character illustrated either in Figs. 5, 6 or Fig. 7.

In Figs. 1 and 2, a plate 21 is shown as closing the upper end of the mixing zone defined by the lower tubular member 7. However, in Figs. 11 and 12, this arrangement is different in the sense that the plate 21 is replaced by a plate 34 which defines a large central passage. Supported by the plate 34 and suitably secured to the upper surface thereof is a ring 35 comprising an inwardly opening expansion slot 35a, the passage defined by the ring 35 being alined with the aforesaid plate passage. The ring 35 permits relative movement of the parts arising from temperature difference between the associated tubular members 7 and 8.

A plurality of webs or ribs 15 of the character hereinbefore described are shown as extending radially with respect to the casing C, these webs 15 being welded or otherwise suitably secured to the tubular member 8 and to the aforesaid ring 35, Fig. 12. The webs 15 of Figs. 11, 12 and 13 have suitably secured thereto inner and outer, concentrically related channel members 16 and 17 of the character hereinbefore described. Suitably secured, as by bolts 36, to the lower horizontal portion of the channel member 16 is a dished member 37 having a large central passage 37a vertically alined with the respective passages of the ring 35 and of the plate 34, Fig. 12, the member 37 also being suitably secured to the associated web 15. Further, in the same manner as described with respect to Figs. 1, 2 and 3, the upper surfaces of the respective channel members 16 and 17 of Figs. 11 and 12 detachably support a plurality of arcuate plates 22.

The described assembly of parts for the lower contact mass M of Figs. 11–14 inc. may be supported in any suitable manner. As herein shown, although not necessarily, the inner surface of the casing C has welded or otherwise suitably secured thereto a plurality of spaced brackets 38, the upper surfaces of which are disposed in a horizontal plane. Secured in suitable manner to the exterior surface of the tubular member 8, Figs. 11 and 15, are a plurality of similar spaced brackets 39 which engage the respective brackets 38 in detachable supporting relation. Thus, in the manner described, the lower contact mass M is supported in operative position as shown in Figs. 11 and 12.

Referring to Figs. 11 and 15, an annular member 40 is shown as welded in sealing relation to the inner surface of the casing C and to a peripheral surface of the outer channel member 17, said member 40 being utilizable as hereinafter described.

As clearly appears from Fig. 11, the casing C carries a plurality of the hereinbefore described sets of spaced brackets 38, the distance between adjacent sets of said brackets progressively increasing, in the form of the invention shown in Fig. 11, in a direction extending upwardly from the bottom of the casing. Each set of brackets 38, above the lower set, detachably carries an assembly of parts which, except dimensionally, is a duplicate of the assemblies hereinbefore described as carried by the lower set of brackets 38. Hence, further description of these assemblies is considered unnecessary and, in view of the foregoing, it will be understood that the heights of the respective contact masses shown in Fig. 11 progressively increase in an upward direction. Further, the relation is such that, interiorly of the casing C of Fig. 11 there are chambers $c1$, $c2$, $c3$ and $c4$ of the character hereinbefore described. Each of the chambers $c4$ is open at its bottom for the free admission of a stream of vapors. However, each chamber $c4$ is closed at its top by an annular member 40 of the character described above.

As shown in Fig. 11, a suitably supported pipe or conduit 41 extends into each casing chamber $c3$ where each pipe 41 terminates in a suitable nozzle or atomizer 42 which should be directed downwardly preferably, but not necessarily, in coincidence with the longitudinal axis of that tubular member 7 which is disposed therebelow. As a result, atomized liquid material is caused to traverse the path defined by the adjacent set of the hereinbefore described set of alined passages $37a$, $35a$, $34a$ and thereafter enter the adjacent mixing zone. As indicated, all of the pipes 41 may be connected to a common supply pipe 43.

The contact masses M illustrated in Fig. 11 may be formed from catalytic contact material of the character described above with respect to Fig. 1. During operation of the reactor or converter shown in Fig. 11 and after the contact masses have been regenerated to elevate the temperature of the contact material into a suitable cracking range, for example, as hereinbefore described, hydrocarbon vapors are admitted continuously to the casing C by way of the passage 2. Simultaneously, hydrocarbon material, which preferably is at least partially in the liquid phase, is passed through the pipe 43 and then through the pipes 41. The hydrocarbon vapors and material referred to immediately above should have temperature and should otherwise be of the character hereinbefore described with respect to Fig. 1.

Further, as regards Fig. 11, the hydrocarbon vapors, after admission to the casing C by way of the passage 2, enter the chamber $c2$ and thereafter are deflected by the bottom plate 32 of the lower contact mass M so that said vapors flow upwardly through the lower chamber $c4$ and are prevented from escaping from the top thereof by the lower annular member 40. Thereafter, in the manner previously described, the hydrocarbon vapors pass transversely through the lower contact mass M with resultant production of cracked products which enter and pass upwardly through the mixing zone defined by the lower tubular member 7, Fig. 11. As the foregoing operation proceeds, hydrocarbon cracking material, as described above and while at least partly in the liquid phase, passes from the lower nozzle 42 continuously into the aforesaid mixing zone in counter-current relation as regards the ascending vapors from the lower contact mass M. As a result, there is produced a mixture which preferably is completely vaporized and which has temperature substantially lower than the average temperature of the succeeding contact mass M directly above the lower contact mass M, this mixture passing upwardly through the respective passages defined by the plate 34 and the ring 35.

Thereafter, as well be obvious in view of the preceding description relating to Fig. 1, the operation proceeds with respect to the upper contact masses M of Fig. 11 in the same manner as described immediately above with respect to the lower contact mass M. Eventually, the cracked vapors leave the casing C of Fig. 11 by way of the passage 1 and thereafter pass to any suitable destination, not shown.

As regards the forms of my invention hereinbefore described, the atomized liquid hydrocarbon material, in each instance, passes through the various mixing zones generally in countercurrent relation with respect to the cracked hydrocarbon vapors traversing said zones. However, the invention is not to be thus limited. Thus, in Fig. 16, I have shown a reactor or converter of the character illustrated in Fig. 11, these reactors or converters being duplicates with the exception that the sets of pipes 41 and nozzles 42 are arranged to project the atomized liquid material upwardly through the mixing zones as shown in Fig. 16 rather than downwardly as illustrated in Fig. 11. Therefore, as regards Fig. 16, it will be understood that the atomized liquid material and the cracked hydrocarbon vapors move through each mixing zone generally in concurrent relation and, in so doing, the desired vaporizing and heat-exchanging operations are effected. Otherwise, the operation of the converter or reactor of Fig. 16 is the same as described above with respect to Fig. 11.

As regards all forms of my invention, a heat-exchange operation is conducted in each mixing zone between the high temperature cracked products issuing from a contact mass and the admitted low temperature hydrocarbon material which is to be vaporized. The invention is not to be thus limited since the cracked products may be cooled otherwise as, for example, by indirect heat exchange with a cooler medium such as water which passes through a conduit system suitably arranged in the mixing zone.

The advantages of my invention, in addition to those hereinbefore noted, are numerous and of importance. Thus, as hereinbefore stated, the vapors admitted to the casing C either by way of the passage 1, Fig. 1, or by way of the respective passages 2, Figs. 11 and 16, may have temperature ranging from 800° F. to 900° F. and preferably approximately 850° F., these vapors, after admission, passing immediately into an entrance chamber $c4$. When the contact masses have annular configuration as described, the heat-exchange operations conducted in the several mixing zones (each of which is defined by a tubular member 7) substantially lower the temperature of the respective vaporized mixtures to produce cooled products which enter all of the chambers $c4$ with the exception of the entrance chamber $c4$. Further, as described, the temperature of these vaporized mixtures or cooled products range, preferably, between 800° F. and 900° F. Accordingly, in view of the foregoing, it follows that all of the chambers $c4$ of each casing C are traversed by vapor material having temperature ranging between 800° F. and 900° F. and, preferably, about 850° F. As hereinbefore stated, the temperature, at the start of each on-stream period, of the contact material of each contact mass M immediately adjacent each tubular member 8 (the contact mass outer peripheral support) ranges between 900° F. and 1100° F. It follows, therefore, that the aforesaid vapor material last named, effectively prevents the heat of each contact mass from raising the temperature, to any substantial extent, of the adjacent portion of the casing C. This, as will be understood, is highly desirable because greatly prolonging the life of each casing C compared with that which would result if the chambers $c4$ were traversed by vapor material having the temperature of the cracked products as they emerge from each contact mass.

It was hereinbefore stated that the described on-stream operation is characterized by temperature undulation of the reactants as they pass along their intended path through each casing C. However, the vapor material entering each chamber $c4$ is substantially free from temperature undulation even though during continuance of an on-stream operation, the temperature of such vapor material decreases to some extent. Accordingly, temperature undulation of the casings C occurs only to a limited extent and this, likewise, contributes to the life expectancy thereof.

Again, when vapors traverse a contact mass, the pressure thereof necessarily drops between the entrance and exit sides of said contact mass and, as known in the art, it is desirable for such pressure drop to be maintained relatively low. This is true particularly by reason of the fact that more flexible on-stream operation is attainable when the pressure drop is relatively low and, during regeneration, less energy is required to establish and maintain flow of the regenerating medium through the contact masses. With annular contact masses of the character herein disclosed, the pressure drop is proportional to the thickness thereof, namely, the length of a straight line extending horizontally from the interior surface of a contact mass to the exterior thereof. For a given straight line distance (which establishes the pressure drop) the height of an annular contact mass may readily be selected in order to fulfill requirements concerning the amount of contact material which must necessarily be present in order for the desired conversion to be effected.

Further, when a contact mass has annular configuration as stated, the cracked products converge into the described mixing zone which extends along the longitudinal axis thereof. This is desirable from the viewpoint of efficiency as regards the heat-exchange operation which is conducted in this zone in the manner referred to above.

As regards each form of my invention hereinbefore described, all of the contact masses operate under the same conditions. Additional reactants are introduced between each pair of adjacent contact masses and, in order to maintain substantially the same space velocity of reactants in each mass, it is desirable for the length of the respective contact masses to progressively increase so that they contain progressively increasing amounts of contact material in the direction of flow of said reactants. In this connection, it will be noted that the thickness of all the contact masses is the same or substantially so. An important feature of various forms of the invention involves, then, substantially uniform thickness of a plurality of annular contact masses which, in the direction of flow of the reactants, contain progressively increasing amounts of contact material for the reason stated above.

Although the invention has been illustrated and described with respect to converter arrangements comprising four contact masses, it shall be understood that the invention is not to be thus limited since any suitable number of contact masses may be utilized as desired. Further, as regards a broad aspect of the invention, the arrangement may be such that a vaporizer comprising a contact mass formed from inert contact material, as hereinbefore described, may be associated with a single annular contact mass of of the character described above, the vapor products from the vaporizor being subjected to a heat-exchange operation as described herein and then passed into the annular chamber c4 of said last named contact mass.

As hereinbefore described, the set of supporting parts for each contact mass M of Figs. 1 and 2 is detachably carried by a plurality of supports 3 and, for each contact mass M of Figs. 11, 12 and 15, brackets 15 are utilized in similar manner. With arrangements of this character, should serious defects develop in one or more of the contact masses or associated parts, the casing C may be opened in suitable manner and the defective contact mass removed as a unit either for repair or replacement as may be desirable.

After continued use of the apparatus of my invention for a long period, the catalytic contact material A forming the contact masses M may become deactivated to such extent that replacement thereof is desirable. If so, as shown in Figs. 1 and 2, a workman may enter the chamber c2 by way of the manhole 26 to position and suitably support inclined pipes 44 so that the upper inlet ends thereof register with the respective passages 4b of the lower plate 4 whereas the lower outlet ends of said pipes 44 are disposed in communicating relation with the casing passage 2. Thereupon, after the respective members 5 are moved horizontally to open the aforesaid passages 4b, the contact material forming the lower contact mass M gravitates downwardly through said passages 4b together with the respective associated pipes 44 and then leaves the casing C by way of the passage 2, said contact material being carried from the vicinity of the passage 2 by any suitable means, not shown. At this time, a workman may enter the lower chamber c3 of casing C by way of the lower manhole 24 and, after removal of selected bolts 23 and 23b, an arcuate plate 22 of the lower set thereof may be detached from its normal position on the channel members 16 and 17 so that the workman last noted may enter the chamber for the lower contact mass and assist in removing the contact material therefrom in the manner described above.

While the contact material is thus being removed from the aforesaid chamber or while removal thereof is in progress and, after a proper pair of oppositely related arcuate plates 22 of the lower set thereof have been detached from their normal seated position on the channel members 16 and 17, a workman within the lower chamber c3 may position and suitably support vertical pipes 45 in alinement with the respective passages 4b of that plate 4 directly above the lower contact mass M, said pipes extending through the respective openings which were exposed upon removal of the arcuate members 22 last named. Thereupon, the respective members 5 which are associated with the last noted passages 4b may be moved horizontally to open said passages and thereby permit gravitating movement of contact material forming the contact mass under consideration into the chamber of the lower contact mass and thence from said chamber in the manner described above.

In view of the foregoing, it will be understood that, in response to operations performed in the general manner described above, the contact material A forming each upper contact mass M is permitted to gravitate from its enclosing chamber, thence through all of the contact mass chambers disposed therebelow and thence from the casing C in the manner described.

After the operation has been completed by removal of all of the contact material from the casing C, the plugs 14 for the respective housings 13, Figs. 8 and 9, may be detached in succession and replaced by nozzles which are secured to the respective ends of tubes leading to a source of air under high pressure. Thereupon, when a control is exercised to render the air pressure effective at said nozzles, any accumulated dust or other material may be expelled from the chambers c4 in succession and passed into the adjacent upper chamber c3 to be disposed of as desired.

When it becomes desirable to fill the contact mass chambers with contact material, the inclined pipes 44 described above are removed from the position thereof shown in Figs. 1 and 2 and the lowermost set of members 5 are moved horizontally to close the lower passages 4b. At this time, however, the sets of pipes 45 remain in the respective position thereof illustrated in Fig. 1 and all of the plate passages 4b are open except the lowermost set thereof. Thereupon, after removal of one or more of the upper set of arcuate plates 22, the fresh supply of contact material is passed into the casing C by way of the manhole 25 and thence suitably directed into the chamber which normally defines the upper contact mass M. This contact material gravitates through the chamber last named and thereafter arrives in the lower contact mass chamber after gravitation thereof through the intermediate contact mass chambers. Eventually, the lower contact mass chamber is filled with contact material whereupon a workman in the lower chamber c3 removes the lower set of pipes 45 and restores the associated parts to the respective positions thereof illustrated in Figs. 1 and 2. Thereupon, the operation continues in the general manner described above until all of the contact mass chambers have been filled. It will be understood that a workman should be in each chamber, while the filling operation is in progress, in order to properly distribute the contact material.

As regards the removing and filling operations described above, it shall be understood that my invention is not to be limited to annular contact masses of the character hereinbefore described. As well, from a broader aspect of this phase of the invention, the contact masses may have any desired configuration other than annular.

Obviously many modifications and variations of the invention as hereinbefore set forth may be made without departing from the spirit and scope thereof and, therefore, only such limitations should be imposed as are indicated in the appended claim.

I claim as my invention:

1. In a hydrocarbon cracking process comprising a cracking period and a regeneration period; during which cracking period hydrocarbons contact successively a plurality of beds of static granular catalytic contact material under endothermic cracking conditions and thereby concomitantly deposit coke on each bed in an amount such that subsequent combustion of said coke under the regeneration conditions described hereafter generates an amount of heat such that each of said beds contains, at the close of the regeneration period, stored heat considerably in excess of the endothermic heat of cracking; during which regeneration period oxygen containing gas contacts each of said beds comprising said amounts of coke and effects combustion of the coke on each bed under conditions such that, at the termination of the regeneration period, all portions of each bed are at least at cracking temperature and a portion of each bed intermediate to the locations at which gas enters and leaves said bed is at a higher temperature than the remainder of said bed: the improvement which comprises passing said hydrocarbons through a plurality of annular cracking zones, each cracking zone containing one of said beds of static granular catalytic contact material, solely in a direction normal to the axes of said cracking zones; removing a portion of the heat stored in the catalytic contact material in each bed as sensible heat in the hydrocarbon vapors emerging therefrom, whereby the temperature of the effluent hydrocarbon vapors from each of said beds is higher than the temperature of the entering hydrocarbon vapors; passing hot hydrocarbon vapors immediately after emergence from an annular cracking zone and prior to introduction to the next successive annular cracking zone through a central vapor-liquid mixing zone; injecting into said central vapor-liquid mixing zone, at one end thereof, liquid vaporizable hydrocarbon material at a temperature lower than the temperature of the hot hydrocarbon vapors entering said zone; vaporizing substantially all of said hydrocarbon material by contact with said hot hydrocarbon vapors and producing a mixture of said hot hydrocarbon vapors and vapor from said hydrocarbon material, said mixture having a substantially lower temperature than that of the hot hydrocarbon vapors entering the central mixing zone; and introducing said mixture to the periphery of said next successive cracking zone.

2. The improvement of claim 1 characterized in that each of said annular cracking zones has respectively the same horizontal cross sectional area through its vertical extent and equal amounts of hydrocarbon vapors pass through all unit cross sectional areas of the cylindrical periphery of each respective annular cracking zone.

3. The improvement of claim 2 further characterized in that the horizontal cross sectional areas of all of said annular cracking zones are the same and the vertical height of the various cracking zones progressively increases in the general direction of flow of the hydrocarbon vapors.

4. The improvement of claim 1 characterized in that said liquid hydrocarbon material is injected into said central mixing zone in a direction opposite to the direction of flow of said mixture of hot hydrocarbon vapors introduced to said mixing zone and vapors of said liquid vaporizable hydrocarbon material.

5. The improvement of claim 4 further characterized in that said liquid hydrocarbon material is injected substantially at the top of said central mixing zone.

6. In a hydrocarbon cracking process comprising a cracking period and a regeneration period; during which cracking period hydrocarbons contact successively a plurality of beds of static granular catalytic contact material under endothermic cracking conditions and thereby concomitantly deposit coke on each bed in an amount such that subsequent combustion of said coke under the regeneration conditions described hereafter generates an amount of heat such that each of said beds contains, at the close of the regeneration period, stored heat considerably in excess of the endothermic heat of cracking; during which regeneration period oxygen containing gas contacts each of said beds comprising said amounts of coke and effects combustion of the coke on each bed under conditions such that, at the termination of the regeneration period, all portions of each bed are at least at cracking temperature and a portion of each bed intermediate to the locations at which gas enters and leaves said bed is at a higher temperature than the remainder of said bed: the improvement which comprises passing said hydrocarbons through a plurality of annular cracking zones, each cracking zone containing one of said beds of static granular catalytic contact material, solely in a direction normal to the axes of said cracking zones; removing a portion of the heat stored in the catalytic contact material in each bed as sensible heat in the hydrocarbon vapors emerging therefrom, whereby the temperature of the effluent hydrocarbon vapors from each of said beds is higher than the temperature of the entering hydrocarbon vapors; passing hot hydrocarbon vapors immediately after emergence from an annular cracking zone and prior to introduction to the next successive annular cracking zone through a central vapor-liquid mixing zone concentrically and contiguously located with respect to said cracking zone and of substantially the same vertical extent as said cracking zone; injecting into said central vapor-liquid mixing zone, at one end thereof, liquid vaporizable hydrocarbon material at a temperature lower than the temperature of the hot hydrocarbon vapors entering said zone; vaporizing substantially all of said hydrocarbon material by contact with said hot hydrocarbon vapors and producing a mixture of said hot hydrocarbon vapors and vapor from said hydrocarbon material, said mixture having a substantially lower temperature than that of the hot hydrocarbon vapors entering the central mixing zone; directing said mixture upwardly toward the next successive cracking zone; and passing said mixture through substantially the entire outer periphery of said next successive cracking zone.

7. In apparatus for contacting granular solid contact material with gases, the combination of a vertically cylindrical casing, ports in the top and in the bottom of said casing, a plurality of contact material retaining chambers spaced vertically apart along a common axis within said casing, each of said contact material retaining chambers having vertical concentric cylindrical walls and having an outside diameter less than the inside diameter of the casing so that a plurality of annular vapor chambers are defined by the inside boundary of the casing and the outside boundary of each of said contact material retaining chambers, the inside wall of each contact material retaining chamber forming the wall of a cylindrical vapor-liquid mixing chamber, the inside and outside cylindrical walls of each of said contact material retaining chambers being perforate, closure means at the top and at the bottom of each of said contact material retaining chambers, closure means at one end of each of said annular vapor chambers, means for preventing substantial flow of vapors from each of said cylindrical vapor-liquid mixing chambers at the end of said chamber opposite to the end at which said closure means for said annular vapor chamber is located and liquid injection means in at least one of said cylindrical vapor-liquid mixing chambers, said liquid injection means being located proximate to the end of said chamber opposite to the end at which said means for preventing substantial flow of vapors is located.

8. In apparatus for contacting granular solid contact material with gases, the combination of a vertically cylindrical casing, ports in the top and in the bottom of said casing, a plurality of contact material retaining chambers spaced vertically apart along a common axis within said casing, each of said contact mass retaining chambers having vertical concentric cylindrical walls and having an outside diameter less than the inside diameter of the casing so that a plurality of annular vapor chambers are defined by the inside boundary of the casing and the outside boundary of each of said contact material retaining chambers, the inside wall of each contact material retaining chamber forming the wall of a cylindrical vapor-liquid mixing chamber, the inside and outside cylindrical walls of each of said contact material retaining chambers being perforate, closure means at the top and at the bottom of each of said contact material retaining chambers, closure means at the tops of each of said annular vapor chambers, closure means at the bottom of each of said cylindrical vapor-liquid mixing chambers and liquid injection means in the next to the top and all lower cylindrical vapor chambers, said liquid injection means being located proximate to the top of the respective cylindrical vapor-liquid mixing chamber and concentrically with respect thereto.

9. In apparatus for contacting granular solid contact material with gases, the combination of a vertically cylindrical casing, ports in the top and in the bottom of said casing, a plurality of contact material retaining chambers spaced vertically apart along a common axis within said casing, each of said contact material retaining chambers having vertical concentric cylindrical walls and having an outside diameter less than the inside diameter of the casing so that a plurality of annular vapor chambers are defined by the inside boundary of the casing and the outside boundary of each of said contact material retaining chambers, the inside wall of each contact material retaining chamber forming the wall of a cylindrical vapor-liquid mixing chamber, the inside and outside cylindrical walls of each of said contact material retaining chambers being perforate, closure means at the top and at the bottom of each of said contact material retaining chambers, closure means at the bottom of each of said annular vapor chambers, means at the top of each of said cylindrical vapor-liquid mixing chambers for preventing substantial flow of vapors from each of said cylindrical vapor chambers while permitting downward flow of small amounts of liquid, liquid injection means in the next to the bottom and all higher chambers, said liquid injection means being located proximate to the bottom of the respective cylindrical vapor-liquid mixing chamber and concentrically with respect thereto.

10. In apparatus for contacting granular solid contact material with gases, the combination of a vertically cylindrical casing, ports in the top and in the bottom of said casing, a plurality of contact material retaining chambers spaced apart in vertically superposed relation within said casing, each of said contact material retaining chambers having vertical concentric cylindrical walls and having an outside diameter less than the inside diameter of the casing so that a plurality of annular vapor chambers are defined by the inside boundary of the casing and the outside boundary of each of said contact material retaining chambers, the inside wall of each contact material retaining chamber forming the wall of a cylindrical vapor-liquid mixing chamber, the inside and outside cylindrical walls of each of said contact material retaining chambers being perforate, closure means for one end of each of said annular vapor chambers, means for preventing substantial flow of vapors from each of said cylindrical vapor-liquid mixing chambers at the end of said chamber opposite to the end at which said closure means for said annular vapor chamber is located, liquid injection means in vapor-liquid mixing chambers, at least partially removable top closure means at the top of each of said contact material retaining chambers, at least partially removable bottom closure means at the bottom of each of said contact material retaining chambers, at least one aperture in the top of each contact material retaining chamber covered by said at least partially removable top closure means, and at least one aperture in the bottom of each contact material retaining chamber covered by said at least partially removable bottom closure means, said aperture in the top of each contact material retaining chamber except the uppermost being in vertical alignment with said aperture in the bottom of the contact material retaining chamber thereabove whereby charging and discharging contact material to each of said contact material retaining chambers is facilitated.

11. The apparatus of claim 10 characterized in that said at least partially removable top closure means comprises a plurality of arcuate plates removably mounted on pairs of horizontally curved channel-shaped members, which channel-shaped members are horizontally spaced apart and are affixed to the top of each contact mass retaining chamber, said arcuate plates being contiguously mounted on said channel-shaped members.

12. The apparatus of claim 10 characterized in that said at least partially removable bottom closure means comprises a horizontal plate with apertures therein, slidable covers for said apertures and tracks affixed to said plate for sliding said covers into positions covering and uncovering said apertures.

13. In a reactor for contacting granular, solid contact material with hydrocarbon vapors, the combination of a vertically cylindrical casing, ports in the top and bottom of said casing, a contact material retaining chamber having vertical cylindrical walls and an outside diameter less than the inside diameter of the casing so that an annular vapor chamber is defined by the inside boundary of the casing and the outside boundary of said contact material retaining chamber, the inside wall of said material retaining chamber forming the wall of a central cylindrical vapor-liquid mixing chamber, the inside and outside cylindrical walls of said contact material retaining chamber being perforate, a flat, horizontally disposed, annularly shaped plate affixed to the bottom of the vertical walls of said contact material retaining chamber and to the wall of said casing, an upwardly directed liquid atomizing nozzle located concentrically in said central vapor-liquid mixing chamber proximate to the bottom thereof, means communicating with the outside of said casing for introducing liquid into said nozzle, closure means for the top of said contact material retaining chamber and said central vapor chamber comprising a dish shaped plate, said dish shaped plate being generally concave upwardly and extending over at least the horizontal extent of said central vapor-liquid mixing chamber, and a short pipe located in the center of said dish shaped plate for drainage of liquid therefrom.

14. In combination, a support, a first set of concentrically related tubular members rising from said support and defining a chamber for a contact mass, each tubular member, throughout substantially the entire area thereof, comprising numerous small passages adapted to be traversed by vapors, and means associated with each passage for decreasing the cross-sectional area thereof, said means comprising a second set of tubular members flushly engaging the respective tubular members of the first set thereof, the tubular members forming the second set thereof having reduced thickness compared with the thickness of the respective tubular members forming the first set thereof, each tubular member of the second set thereof comprising numerous small passages which are alined with the respective passages first named, each passage of the second set of tubular members having cross sectional area substantially less than that of each passage first named.

EUGENE JULES HOUDRY.

References Cited in the file of this patent

UNITED STATES PATENTS

| Number | Name | Date |
|---|---|---|
| 1,895,063 | Zurcher | Jan. 24, 1933 |
| 2,365,893 | Mather et al. | Dec. 26, 1944 |
| 2,391,315 | Hulsberg | Dec. 18, 1945 |
| 2,433,255 | Atwell | Dec. 23, 1947 |
| 2,452,569 | Houdry | Nov. 2, 1948 |
| 2,475,822 | Cummings | July 12, 1949 |
| 2,475,855 | Peters | July 12, 1949 |